(12) United States Patent
Van Der Woning et al.

(10) Patent No.: US 10,194,768 B2
(45) Date of Patent: Feb. 5, 2019

(54) BEVERAGE MACHINE

(71) Applicant: KONINKLIJKE PHILIPS N.V., Eindhoven (NL)

(72) Inventors: Mark Ronald Van Der Woning, Eindhoven (NL); Fred Fraij, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 245 days.

(21) Appl. No.: 15/107,228

(22) PCT Filed: Oct. 1, 2014

(86) PCT No.: PCT/EP2014/071095
§ 371 (c)(1),
(2) Date: Jun. 22, 2016

(87) PCT Pub. No.: WO2015/101428
PCT Pub. Date: Jul. 9, 2015

(65) Prior Publication Data
US 2017/0000290 A1  Jan. 5, 2017

(30) Foreign Application Priority Data
Dec. 31, 2013 (EP) .................................... 13199881

(51) Int. Cl.
*A47J 31/00* (2006.01)
*A47J 31/44* (2006.01)
(Continued)

(52) U.S. Cl.
CPC ........... *A47J 31/4478* (2013.01); *A47J 31/46* (2013.01); *A47J 31/0631* (2013.01); *A47J 31/4475* (2013.01)

(58) Field of Classification Search
CPC . A47J 31/4478; A47J 31/4475; A47J 31/0631
(Continued)

(56) References Cited

U.S. PATENT DOCUMENTS 4,056,050 A    11/1977  Brown
4,328,740 A *  5/1982  McDonough ....... A47J 31/0621
                                                      99/285
(Continued)

FOREIGN PATENT DOCUMENTS

DE    29711421 U1    9/1997
DE    19727888    *  11/1998  .......... A47J 31/4478
GB    2321179 A      7/1998

*Primary Examiner* — Reginald L Alexander

(57) ABSTRACT

A beverage machine that includes a brewing chamber; and a dispensing spout for dispensing liquid into the brewing chamber, wherein the dispensing spout includes a liquid inlet; a main body having a central axis and at least a first liquid outlet and a second liquid outlet, wherein the second liquid outlet has a larger distance from the central axis than the first liquid outlet; a liquid distributor fluidly connecting the liquid inlet selectively to the first liquid outlet or to the second liquid outlet, and an actuator for changing a position of the liquid distributor relative to the main body between at least a first position, wherein the liquid inlet is fluidly connected to the first liquid outlet and a second position, wherein the liquid inlet is fluidly connected to the second liquid outlet.

18 Claims, 12 Drawing Sheets

(51) Int. Cl.
*A47J 31/46* (2006.01)
*A47J 31/06* (2006.01)

(58) Field of Classification Search
USPC .................................................. 99/305, 315
See application file for complete search history.

(56) References Cited

U.S. PATENT DOCUMENTS

| | | | | |
|---|---|---|---|---|
| 5,415,080 | A | * | 5/1995 | Charles ............... A47J 31/0573 |
| | | | | 99/299 |
| 5,477,775 | A | * | 12/1995 | Delhom .............. A47J 31/4478 |
| | | | | 99/299 |
| 6,513,419 | B2 | * | 2/2003 | Huber ................. A47J 31/4478 |
| | | | | 426/433 |
| 6,779,437 | B2 | | 8/2004 | Sachtleben |
| 7,429,005 | B2 | | 9/2008 | Schapper |
| 7,581,490 | B2 | * | 9/2009 | Grant ................. A47J 31/4475 |
| | | | | 99/312 |
| 8,263,155 | B2 | | 9/2012 | Crow |
| 2008/0000357 | A1 | | 1/2008 | Yang |
| 2008/0156196 | A1 | | 7/2008 | Doglioni Majer |

\* cited by examiner

BEVERAGE MACHINE

This application is the U.S. National Phase application under 35 U.S.C. § 371 of International Application No. PCT/EP2014/071095, filed on Oct. 1, 2014, which claims the benefit of International Application No. 13199881.7 filed on Dec. 31, 2013. These applications are hereby incorporated by reference herein.

FIELD OF THE INVENTION

The present invention relates to a beverage machine, in particular to a beverage machine for dispensing hot beverages, such as coffee, tea, hot milk drinks, soups etc. In particular, the present invention relates to a dispensing spout for such a beverage machine.

BACKGROUND OF THE INVENTION

In the past years conventional filter coffee machines have dramatically lost market share to modern semi-automatic single-serve coffee machines as well as to fully automatic coffee machines. Especially the possibility to produce various different types of coffee recipes with one and the same machine, the possibility to easily adjust the strength of the coffee and the easy handling of such single-serve and fully automatic coffee machines have led a lot of consumers to replace their conventional filter coffee machines by these modern coffee machine types.

While modern coffee machines are especially suitable for brewing espresso coffee or coffee having the typical cream, a lot of consumers still prefer the taste of a "regular" coffee produced by a filter coffee machine. More and more consumers therefore tend back to conventional filter coffee machines for reasons of taste.

Compared to single-serve or fully automatic coffee machines most of the conventional filter coffee machines do not allow to adjust the strength of the coffee in an easy manner. What one can do is altering the ratio between water and ground coffee when preparing a brew by adding more or less coffee. However, the strength and taste profile of the coffee is still hard to adjust in an accurate manner. Nevertheless, such an easy adjustment of the strength and taste profile of the coffee becomes more and more important. People like to drink coffee, but the more people, the more difference in taste. The same works for the drip. Some like their coffee strong, some like it milder.

U.S. Pat. No. 6,779,437 B2 presents a filter coffee machine that comprises a water distributor having a center flow-through opening and a plurality of further flow-through openings surrounding the center flow-through opening. The strength of the coffee may be influenced by selecting the openings through which the injected water drizzles into the filter placed in the brewing chamber. If the brewing water flows exclusively through the centrally arranged flow-through opening of the water distributor, the coffee grounds in the filter receptacle are swirled up strongly and result in the brewing of a relatively strong coffee. On the other hand, if the water flows through the remaining flow-through openings located outside of the center, a milder coffee is brewed.

Even though the general possibility to select the strength of the coffee in the way explained in U.S. Pat. No. 6,779,437 B2 has shown to be advantageous, the technical way the water is distributed in the therein shown device has shown to be disadvantageous. One of the main disadvantages of this device is the lack of equal distribution of the water to each of the flow-through openings.

Thus, there is still room for improvement.

Further dispensing spouts for coffee machines which offer the possibility to select the strength of the coffee are known from DE 297 11 421 U1, GB 2 321 179 A, U.S. Pat. No. 5,477,775 A and from U.S. Pat. No. 4,056,050 A.

SUMMARY OF THE INVENTION

It is an object of the present invention to provide a beverage machine, in particular a filter or drip coffee machine, which allows to adjust the taste and/or strength of the beverage in an easy and user-friendly manner, and which specifically overcomes the above-mentioned shortcomings.

In a first aspect of the present invention a beverage machine is presented that comprises:
 a brewing chamber; and
 a dispensing spout for dispensing liquid into the brewing chamber;
 wherein the dispensing spout comprises:
  (i) a liquid inlet;
  (ii) a main body having a central axis and at least (a) a first liquid outlet having a first outlet opening and (b) a second liquid outlet having a plurality of second outlet openings, wherein the second outlet openings have a larger distance from the central axis than the first outlet opening;
  (iii) a liquid distributor for fluidly connecting the liquid inlet selectively to the first outlet opening or to the plurality of second outlet openings, and
  (iv) an actuator for changing a position of the liquid distributor relative to the main body between at least a first, a second and a third position, wherein in the first position the liquid inlet is fluidly connected to the first outlet opening, wherein in the second position the liquid inlet is fluidly connected to the plurality of second outlet openings, and wherein in the third position the liquid inlet is fluidly connected to the first outlet opening and the plurality of second outlet openings,
 wherein the liquid distributor comprises a separator element that divides an interior of the main body into at least an upper and a lower compartment, and wherein the separator element comprises at least one flow-through opening by means of which the upper compartment is connected to the lower compartment.

In a second aspect of the present invention a dispensing spout for a beverage machine is presented, wherein the dispensing spout comprises:
 (i) a liquid inlet;
 (ii) a main body having a central axis and at least (a) a first liquid outlet having a first outlet opening and (b) a second liquid outlet having a plurality of second outlet openings, wherein the second outlet openings have a larger distance from the central axis than the first outlet opening;
 (iii) a liquid distributor for fluidly connecting the liquid inlet selectively to the first outlet opening or to the plurality of second outlet openings, and
 (iv) an actuator for changing a position of the liquid distributor relative to the main body between at least a first, a second and a third position, wherein in the first position the liquid inlet is fluidly connected to the first outlet opening, wherein in the second position the liquid inlet is fluidly connected to the plurality of second outlet openings, and wherein in the third position the liquid inlet is fluidly connected to the first outlet opening and the plurality of second outlet openings, wherein the liquid distributor comprises a separator element that divides an interior of the main body into at least an upper and a lower compartment, and wherein the separator element comprises at least one flow-through opening by means of which the upper compartment is connected to the lower compartment.

Preferred embodiments of the invention are defined in the dependent claims. It shall be understood that the dispensing spout according to the second aspect of the present invention has similar and/or identical preferred embodiments as the claimed beverage machine and as defined in the dependent claims.

The presented beverage machine has at least two liquid outlets which are herein denoted as first liquid outlet and second liquid outlet. Each of these liquid outlets may comprise one or more outlet openings that are arranged on a bottom side of the dispensing spout. The bottom side of the dispensing spout faces the brewing chamber during use of the beverage machine. Liquid, e.g. hot water, may therefore leave the dispensing spout through the first and/or the second liquid outlet and may then drizzle into the brewing chamber.

The brewing chamber usually comprises a substantially cone-shaped receptacle for a filter, e.g. for a coffee or tea filter. An extractable food product, e.g. coffee or tea ground, may be placed together with the filter in this receptacle. Liquid leaving the dispensing scout flows through the extractable food product and the filter, thereby extracts a beverage, e.g. coffee or tea, and then flows from the brewing chamber into a vessel of the consumer, e.g. into a pot or cup.

One of the core features of the presented beverage machine is a liquid distributor that allows to dispense liquid into the brewing chamber either through the first liquid outlet or through the second liquid outlet. The liquid distributor distributes the liquid internally in the dispensing spout, such that liquid entering the dispensing spout at its liquid inlet leaves the dispensing spout either via the first liquid outlet or via the second liquid outlet. It shall be noted that the dispensing spout may also comprise further liquid outlets, e.g. a third liquid outlet, as this will be explained further below.

The main advantage of the liquid distributor is its inherent liquid distribution function by means of which the strength and taste of the produced beverage may be adjusted. If the liquid distributor guides the liquid in a first setting towards the first liquid outlet, the produced or brewed beverage (e.g. coffee or tea) will become stronger as if the liquid leaves the dispensing spout through the second liquid outlet. The reason for this difference is the same as explained in U.S. Pat. No. 6,779,437 B2. The second liquid outlet has a larger distance from the central axis of the dispensing spout than the first liquid outlet. The second liquid outlet is thus farther away from the centre of the dispensing spout. Liquid leaving the second liquid outlet will therefore flow through the filter at a farther distance from the centre of the brewing chamber than liquid leaving the first liquid outlet. In the first setting (liquid leaving through the first liquid outlet), the liquid will therefore get in contact with more material/volume of the extractable food product (e.g. coffee or tea ground), such that the resulting beverage becomes stronger. In the second setting (liquid leaving through the second liquid outlet) the liquid will drizzle through the brewing chamber at a closer distance to the outer periphery of the filter, i.e. at a farther distance from the centre of the filter, such that the liquid contacts less material/volume of the extractable food product, which then results in a milder beverage. In an embodiment it is also possible that the liquid distributor fluidly connects the liquid inlet both to the first liquid outlet and to the second liquid outlet.

The consumer therefore has the chance to easily adjust the strength and taste of the coffee by simply switching the liquid distributor between different settings. An accurate adjustment of the amount of extractable food product that is entered into the filter is no longer that important.

Switching the liquid distributor between its different settings may be done in various ways, e.g. electrically or manually. The consumer might not even take notice of the liquid distributor and of the way it functions. This results in a very user-friendly and easy to handle beverage machine.

The liquid distributor is preferably arranged inside the main body of the dispensing spout. Changing the strength/taste setting may be done by changing the position of the liquid distributor within the main body of the dispensing spout. The position of the liquid distributor may be changed by means of an actuator. This actuator may either comprise an electrical actuator such that the user may, for example, press a button and the liquid distributor changes its position automatically, or it may comprise a mechanical actuator which allows the user to manually change the position of the liquid distributor.

A major advantage of the herein presented beverage machine over the machine presented in U.S. Pat. No. 6,779, 437 B2 follows from the technical design of the liquid distributor. The herein presented liquid distributor allows to equally distribute the liquid within the dispensing spout. In the second setting, in which the liquid leaves the dispensing spout through the plurality of second outlet openings of the second liquid outlet, approximately the same amount of liquid leaves through each of the plurality of second outlet openings. This guarantees an equal liquid distribution within the brewing chamber.

The liquid distributor thereto comprises a separator element that divides the interior of the main body into at least two levels, a first level which is herein denoted as upper compartment and a second level which is herein denoted as lower compartment. In a preferred embodiment, the separator element and the actuator are integral parts of the liquid distributor. The separator element further comprises at least one flow-through opening that may fluidly connect the upper compartment with the lower compartment. The main body of the dispensing spout comprises a lid and a bottom part which together define a hollow in the interior of the base body. The upper compartment is arranged between the lid and the separator element, and the lower compartment is arranged between the separator element and the bottom part. Depending on the position of the liquid distributor relative to the main body, the at least one flow-through opening connects the upper compartment with the lower compartment. Liquid may thus enter the dispensing spout via the liquid inlet and will then flow into the upper compartment. Parts or all of the injected liquid will then be collected in the upper compartment before the liquid flows further towards one of the liquid outlets. This guarantees a substantially equal flow distribution.

In the first setting of the liquid distributor, the liquid will flow from the upper compartment via an outlet channel to the first liquid outlet. This outlet channel is preferably arranged close to or along the central axis of the dispensing spout and preferably integrated into the interior of the liquid distributor, as this will be explained in more detail further below. In the second setting of the liquid distributor, the liquid will flow from the upper compartment via the at least one flow-through opening into the lower compartment.

From there, the liquid will be equally distributed within the lower compartment and finally leaves the dispensing spout via the plurality of second openings of the second liquid outlet. The at least one flow-through opening is therefore only accessible for the injected liquid in the second setting (but not in the first setting).

The position of the liquid distributor may also be changed into a third position, wherein in the third position the liquid inlet is fluidly connected to the first liquid outlet and the second liquid outlet simultaneously. If the dispensing spout also comprises a third liquid outlet, the liquid inlet is in this third position of the liquid distributor also connected to the third liquid outlet. In other words, the liquid inlet is then in the third position of the liquid distributor fluidly connected to the first liquid outlet, the second liquid outlet and to the third liquid outlet simultaneously.

In this case the liquid will leave the dispensing spout through all outlets at the same time. This mode is especially advantageous for cleaning and decalcifying the dispensing spout, since the liquid is then distributed to all parts and chambers in the interior of the dispensing spout. This enables a very easy cleaning. In order to further facilitate the cleaning of the dispensing spout, the liquid distributor is preferably designed to be removable from the dispensing spout. In case of a blockage, the user may thus simply open the lid of the dispensing spout, take out the liquid distributor, such that all parts of the dispensing spout may be separately washed.

According to an embodiment the separator element comprises a disc through which the at least one flow-through opening penetrates.

This disc is preferably arranged perpendicular to the central axis of the main body of the dispensing spout. Several upright standing walls may surround the periphery of the disc. These upright standing walls are preferably arranged perpendicularly to the upper surface of the disc, i.e. arranged parallel to the central axis of the main body of the dispensing spout.

In a first alternative the disc has substantially a shape of an annulus, wherein the at least one flow-through opening has a shape of an annulus sector cut-out. In a second alternative, the substantially annulus-shaped disc comprises a plurality of flow-through openings, e.g. a plurality of circular holes that project through the disc.

In a further refinement the actuator comprises a handle element for rotating the liquid distributor about the central axis.

The handle element may comprise a grip for manually changing the position of the liquid distributor, preferably for rotating the liquid distributor about the central axis. Rotating the liquid distributor to switch between the different strength and/or taste settings may be guaranteed in a mechanically easy manner. First of all, this is easy to handle for the user. Secondly, no complicated mechanisms are necessary thereto, such that production costs may be saved. The handle element may, however, also be rotated electrically.

In a further refinement at least parts of the actuator are integrally formed with the liquid distributor.

This refinement guarantees a stable and mechanically stiff construction with as few as possible parts. The liquid distributor may be integrally formed with the handle or parts of the handle of the actuator. Preferably, the liquid distributor is not fixedly arranged within the main body of the dispensing spout.

In a further refinement the handle element comprises a shaft, wherein the disc is connected to the shaft and arranged transverse, preferably perpendicular, thereto.

The disc is thus directly connected with the shaft that forms at least part of the handle element. The handle element and the disc may also form an integral part. Such a direct connection between the handle element and the disc allows to easily rotate the disc about the central axis in a manual operation in order to switch between the at least two settings of the liquid distributor.

In a further refinement the first liquid outlet comprises an outlet channel that is arranged within a hollow in the shaft.

In other words, the shaft is a hollow shaft. In the first setting of the liquid distributor, the liquid may thus flow from the liquid inlet to the upper compartment and from there through the hollow shaft to the first outlet opening. This enables an arrangement of the first outlet opening in close proximity to the central axis of the main body of the dispensing spout. It is even possible to arrange the first outlet opening directly at the center of the main body of the dispensing spout. This again leads to the highest strength of the brewed beverage. It shall be understood that the first liquid outlet may also comprise a plurality of first outlet openings that are arranged in close proximity to the central axis of the main body of the dispensing spout.

In a further refinement the main body further comprises a third liquid outlet having a larger distance from the central axis than the second liquid outlet, wherein the liquid distributor is configured to fluidly connect the liquid inlet selectively to the first liquid outlet, to the second liquid outlet, or to the third liquid outlet.

This refinement enables even a third setting of the liquid distributor, such that three different strength and taste levels may be realized on total.

The second liquid outlet preferably comprises a plurality of second outlet openings, and the third liquid outlet preferably also comprises a plurality of third outlet openings. In an embodiment, the second and the third outlet openings are concentrically arranged around the central axis of the main body of the dispensing spout. This guarantees an equal liquid distribution within the brewing chamber for the second setting as well as for the third setting of the liquid distributor.

In a further refinement the main body comprises a central chamber, one or more middle chambers, and one or more outer chambers within the interior of the main body, wherein the second outlet openings are arranged in the one or more middle chambers, and the third outlet openings are arranged in the one or more outer chambers.

All chambers are preferably integrated into the bottom part of the dispensing spout. The chambers are preferably separated from each other by means of separation walls that run preferably perpendicular to the bottom side of the dispensing spout. In one embodiment the above-mentioned liquid distributor is arranged within the central chamber. In this case the separator element divides the central chamber into the upper and the lower compartment. By rotating the separator element around the central axis, the central chamber is fluidly connectable either to the middle chambers (where the second outlet openings are arranged) or to the outer chambers (where the third outlet openings are arranged). In this way, the liquid inlet of the dispensing spout is fluidly connected via the flow-through opening in the separator element either to the second outlet openings in the middle chambers or to the third outlet openings in the outer chambers. In the first setting of the liquid distributor, the liquid inlet of the dispensing spout is neither connected to the middle chambers nor to the outer chambers, but only to the first liquid outlet that is arranged within the hollow shaft of the handle element, as explained above.

In a further refinement the actuator preferably comprises a latching mechanism that enables to change the position of the liquid distributor in a stepwise manner.

The liquid distributor may thus be rotated stepwise between the two, three or four above-mentioned positions. The latching mechanism can be connected to the handle element or may be a part of the handle element. However, the latching mechanism may also be arranged somewhere else in the beverage machine, as long as it is functionally or mechanically connected to the actuator. The latching mechanism gives the user an inherent feedback as soon as the actuator latches in one of the selected positions. This facilitates the handling for the user when switching between the different positions.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1:
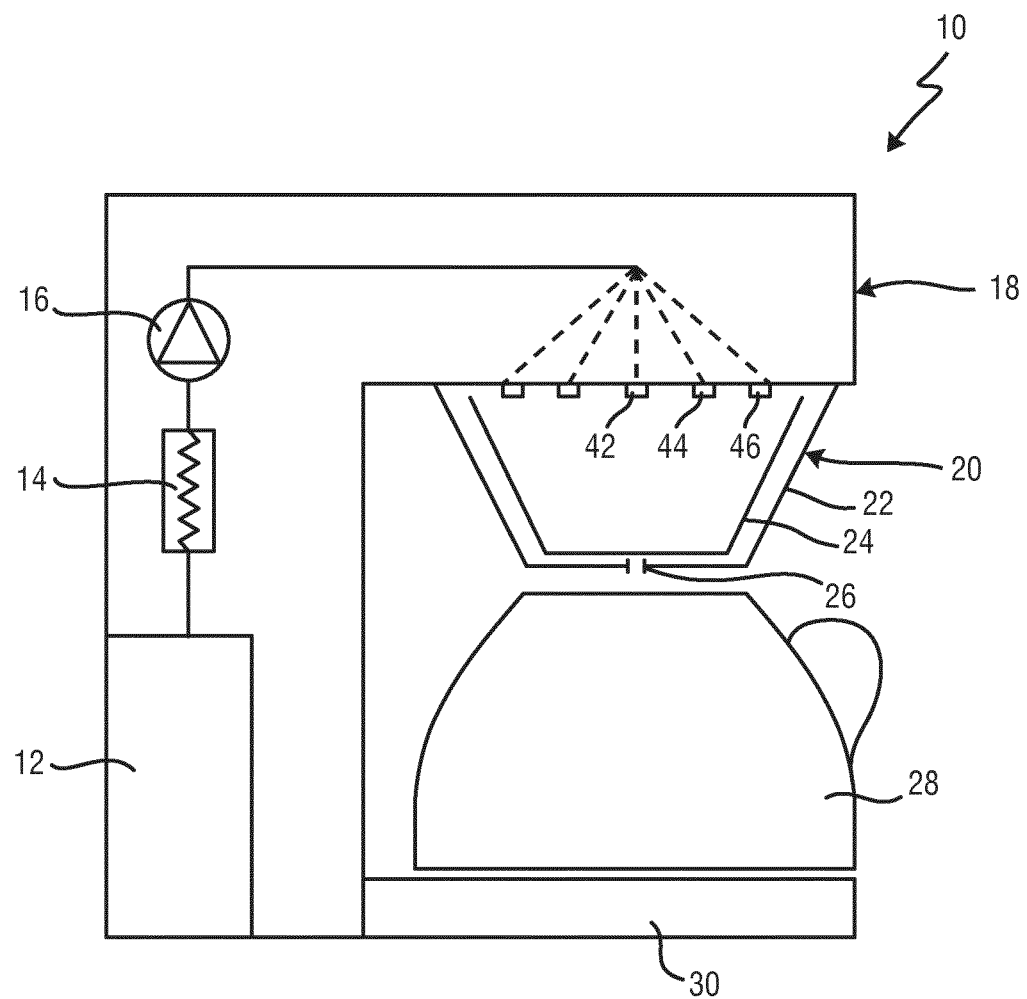
FIG. 1 shows a schematic view of a beverage machine.
Figure 2:
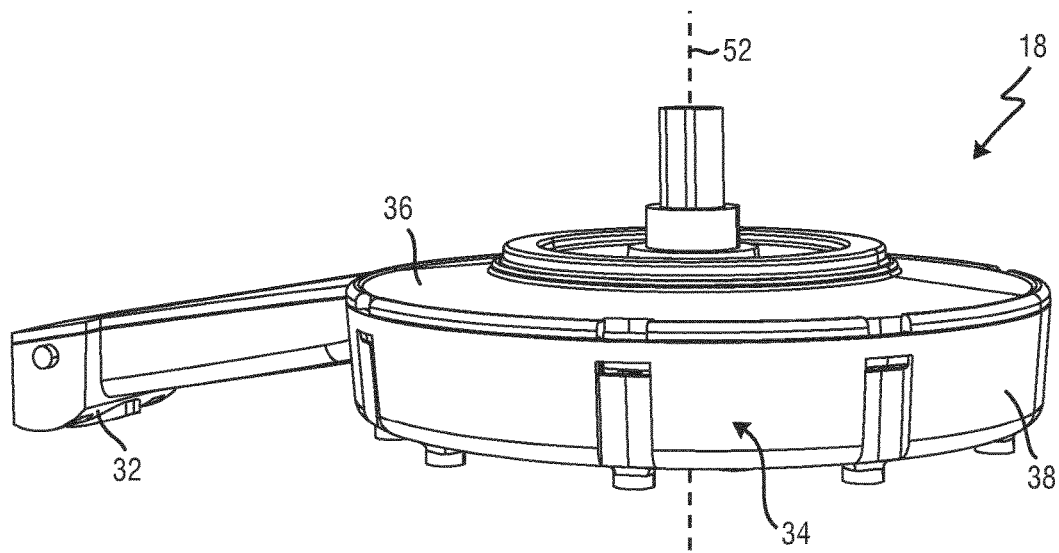
FIG. 2 shows a side view of a dispensing spout of the beverage machine according to a first embodiment of the present invention.

FIG. 1 shows a schematical view of a beverage machine underlying the present invention. The beverage machine is therein denoted in its entirety by reference numeral 10. Such a beverage machine 10 may be used for brewing different kinds of hot beverages, such as e.g. coffee or tea. The beverage machine 10 may be particularly configured as a so-called filter or drip coffee machine.

The beverage machine 10 may comprise one or more liquid tanks 12, one or more heating elements 14, one or more pumps 16, a dispensing spout 18 and a brewing chamber 20. The general function principle of such a filter coffee machine should be clear. Liquid stored in the liquid tank 12 is pumped out of the liquid tank 12 by means of the pump 16. This liquid will be heated by means of the heating element 14. This heating element 14 may either be a static heating element or a flow-through heater. The heating element 14 may either be arranged before or after the pump 16. The pumped out and heated up liquid then flows towards the dispensing spout 18. Before the liquid leaves the dispensing spout 18 via a plurality of liquid outlets 42, 44, 46, the liquid will be distributed internally within the dispensing spout 18, as this will be explained further below in more detail. The dispensed liquid then enters the brewing chamber 20 and gets in contact with an extractable food product, e.g. ground coffee. The brewing chamber 20 preferably comprises a substantially cone-shaped receptacle 22 for receiving a filter 24. The liquid injected into the brewing chamber 20 therefore drizzles through the extractable food product inserted in the filter 24 and finally leaves the beverage machine 10 via a dispensing outlet 26 into a vessel 28, e.g. into a coffee/tea pot or into a coffee/tea cup. An additional static heating element 30 for heating the vessel 28 during the brewing process may be provided as well.

It shall be understood that FIG. 1 only schematically illustrates the elementary features of such a beverage machine 10 without limiting the scope of the present invention. The beverage machine 10 according to the present invention may, of course, include further detailed features. The core of the present invention particularly relates to the technical design of the dispensing spout 18 and to the technical functions that are realized therewith, as this will be explained in detail in the following.

FIGS. 2-10 show a first embodiment of the dispensing spout 18 according to the present invention. The dispensing spout 18 comprises a liquid inlet 32 through which liquid pumped out of the liquid tank 12 enters the dispensing spout 18. This liquid inlet 32 is fluidly connected in an interior of the dispensing spout 18 to a main body 34 of the dispensing spout 18. The main body 34 is in this case shown to be substantially circular. However, it shall be noted that the main body 14 may also have other shapes, such as e.g. a rectangular or a quadratic shape. The main body 34 comprises a lid 36 and a bottom part 38. The lid 36 and the bottom part 38 together define a hollow in the interior of the main body 34. The dispensing spout 18 further comprises a liquid distribution element 40 (see e.g. FIG. 4) which is herein generally denoted as "liquid distributor".

The liquid distributor 40 functions as a kind of distribution valve that allows to distribute the liquid injected via the liquid opening 32 selectively to different liquid outlets. In the embodiment shown in FIGS. 2-10, the dispensing spout 18 comprises three different liquid outlets, a first liquid outlet 42, a second liquid outlet 44 and a third liquid outlet 46 (see e.g. FIG. 3). Each of these liquid outlets 42, 44, 46 comprises one or more outlet openings that are arranged on a bottom side 48 of the dispensing spout 18. The first liquid outlet 42 comprises a first outlet opening 50 which is arranged in close proximity to a central axis 52 of the main body 34 of the dispensing spout 18. This first outlet opening 50 may even be axially aligned with the central axis 52. Each of the second liquid outlet 44 and the third liquid outlet 46 preferably comprise a plurality of outlet openings, which are herein denoted as second outlet openings 54 and third outlet openings 56. The second outlet openings 54 and the third outlet openings 56 preferably concentrically surround the first outlet opening 50 and the central axis 52.

Figure 3:
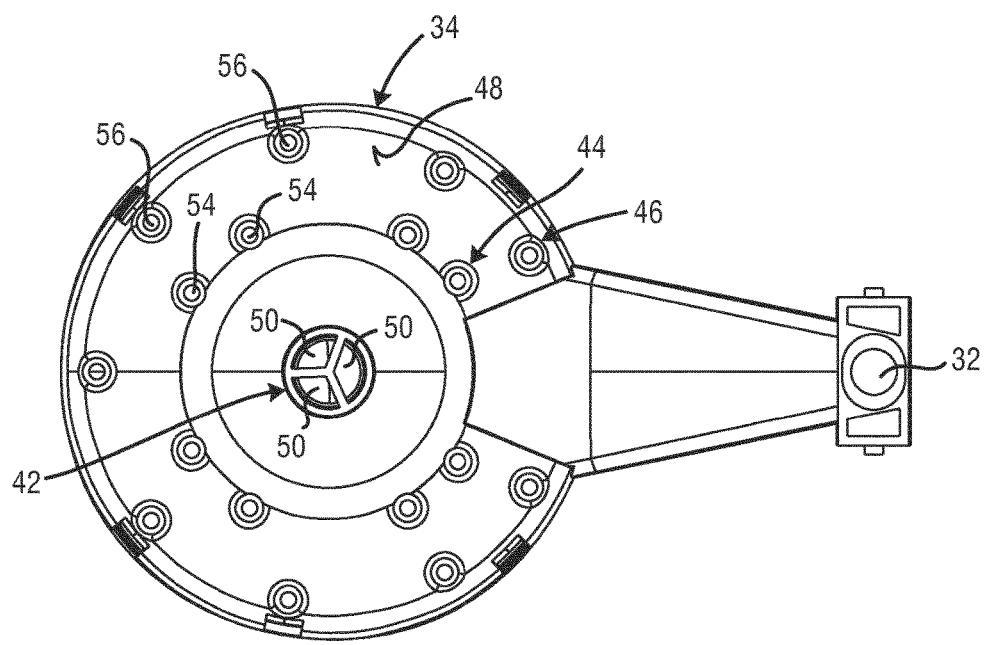
FIG. 3 shows the first embodiment of the dispensing spout from below.
Figure 4:
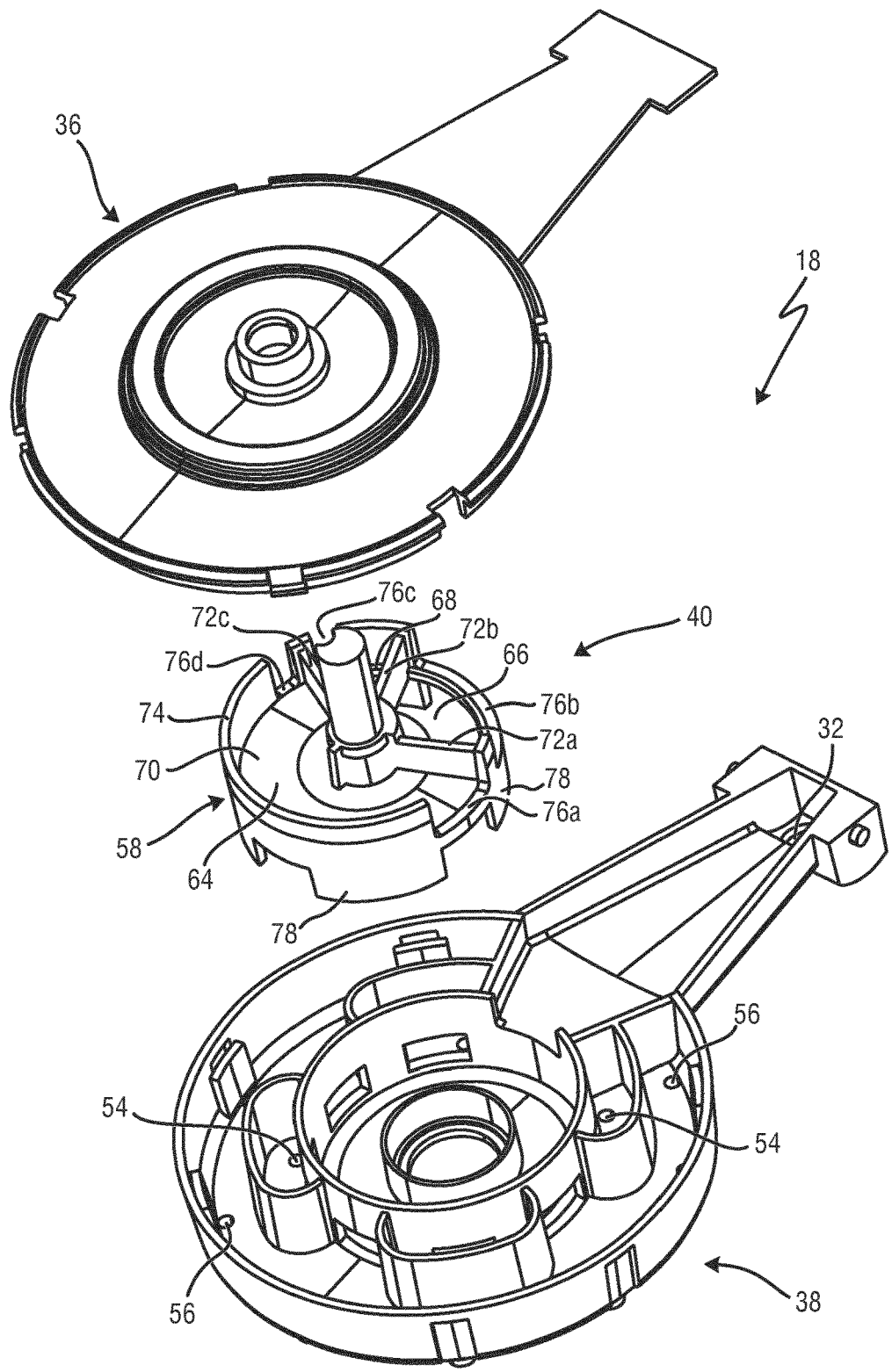
FIG. 4 shows an exploded view of the first embodiment of the dispensing spout.

As it can be e.g. seen in FIG. 3, the second outlet openings 54 have a larger distance from the central axis 52 than the first outlet opening 50. The third outlet openings 56 have an even larger distance from the central axis 52 of the main body 34 than the second outlet openings 54. The liquid distributor 40, which is arranged within the interior of the main body 34 of the dispensing spout 18, enables to fluidly connect the liquid inlet 32 selectively to the first outlet opening 50, the second outlet openings 54 and/or to the third outlet openings 56, as this will be explained in detail further below with reference to FIGS. 7-10.

The strength and taste of the beverage brewed in the beverage machine 10 may be adjusted by directing the liquid within the dispensing spout 18 selectively to either one of the liquid outlets 42, 44, 46, such that the liquid is injected into the brewing chamber 20 either via the first outlet opening 50 or via the second outlet openings 54 or via the third outlet openings 56. The strength and taste of the beverage changes depending on the distance of the outlet openings 50, 54, 56 from the central axis 52, since this changes the fluid-dynamical behavior of the liquid within the brewing chamber 20. The strongest beverage results if the liquid is injected into the brewing chamber 20 via the first outlet opening 50 which is arranged in the center of the main body 34 of the dispensing spout 18. The mildest beverage is received if the liquid is injected into the brewing chamber 20 via the third outlet openings 56 that have the largest distance from the central axis 52 of the main body 34 of the dispensing spout 18. The internal distribution of the liquid within the dispensing spout 18 is achieved by means of a special technical design of the liquid distributor 40 and the bottom part 38 of the main body 34.

Figure 5:
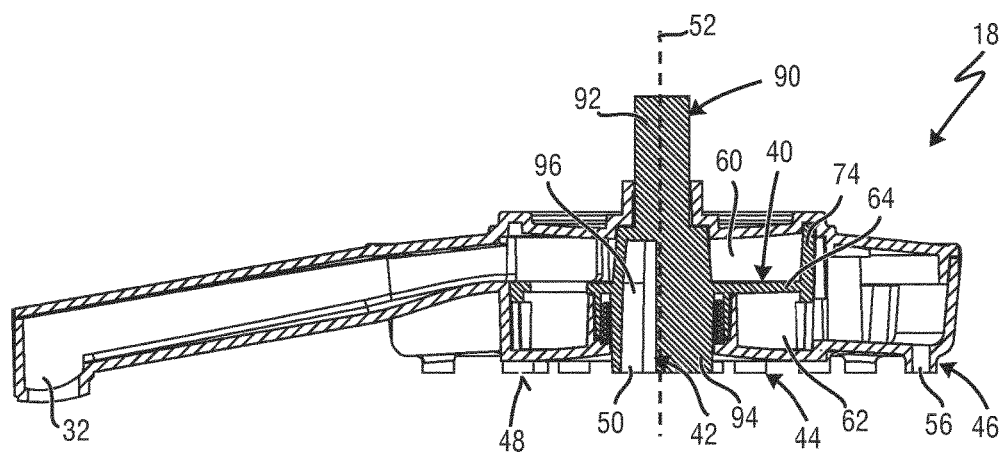
FIG. 5 shows a sectional view of the first embodiment of the dispensing spout.

According to the first embodiment of the dispensing spout 18 shown in FIGS. 2-10, the liquid distributor 40 comprises a separator element 58 (see e.g. FIG. 4) which divides the interior of the dispensing spout 18 into two compartments, an upper compartment 60 and a lower compartment 62 (see e.g. FIG. 5). According to the first embodiment of the dispensing spout 18, the separator element 58 comprises a disc 64. This disc 64 substantially has a shape of an annulus wherein two annulus sectors are cut out from the disc 64. These annulus sector cut-outs build a first flow-through opening 66 and a second flow-through opening 68. The disc 64 is in other words divided in three different parts, a plate-type part 70, the first flow-through opening 66 and the second flow-through opening 68 (see e.g. FIG. 4). Each of the plate-type part 70, the flow-through opening 66 and the flow-through opening 68 have a shape of an annulus sector. The disc 64, in particular the plate-type part 70 of the disc 64, is preferably arranged perpendicularly to the central axis 52. The plate-type part 70, the first flow-through opening 66 and the second flow-through opening 68 are separated from each other by means of several separating walls 72a-72c. The disc 64 is at least partly surrounded by a circumferential wall 74. This circumferential wall 74 is preferably arranged perpendicularly to the disc 64, i.e. parallel to the central axis 52. The circumferential wall 74 comprises a plurality of openings 76a-76d, the function of which will become more apparent below. Still further, the liquid distributor 40 comprises a plurality of blocking walls 78 which are arranged on a lower part of the liquid distributor 40 (see e.g. FIG. 4). The function of these blocking walls 78 will also become apparent further below.

Figure 6:
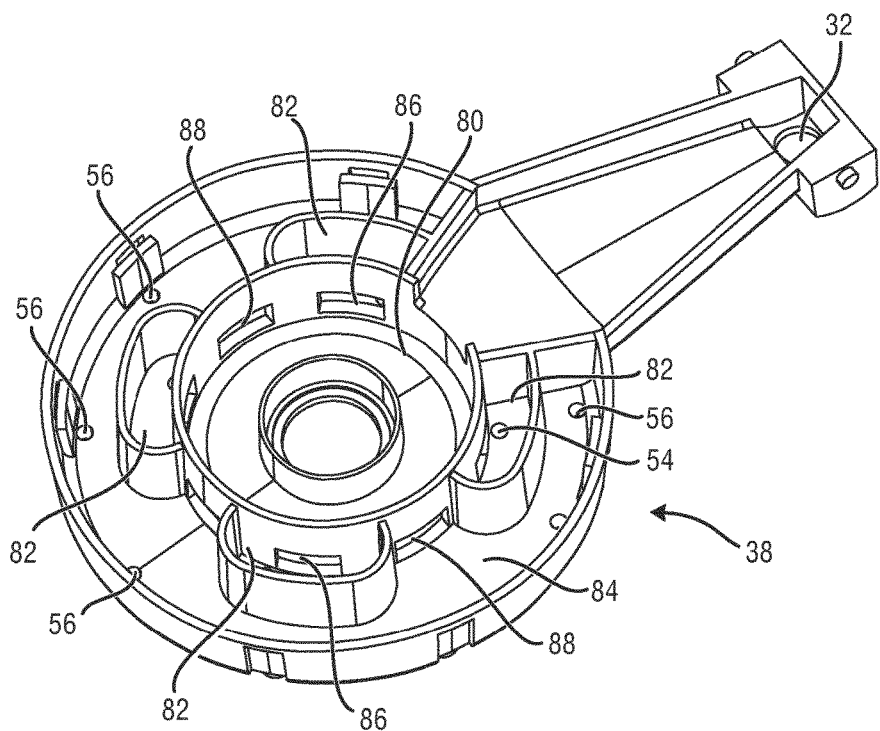
FIG. 6 shows a perspective view of a bottom part of the dispensing spout according to the first embodiment.

The bottom part 38 of the dispensing spout 18 is illustrated in FIG. 6. This bottom part 38 comprises several chambers, a central chamber 80, a plurality of middle chambers 82 and an outer chamber 84. The liquid distributor 40 is arranged in the central chamber 80. The second outlet openings 54 are arranged in the middle chambers 82. The third outlet openings 56 are arranged in the outer chamber 84. Each of the middle chambers 82 and the outer chamber 84 is connected to the central chamber 80 via openings 86, 88. Openings 86 connect the central chamber 80 to the middle chambers 82. Openings 88 connect the central chamber 80 to the outer chamber 84.

The function of the liquid distributor 40 will now be explained with reference to FIGS. 7-10. FIGS. 7-10 show four different settings of the dispensing spout 18, in particular four different settings of the liquid distributor 40. These settings differ from each other in the position of the liquid distributor 40 relative to the main body 34 of the dispensing spout 18. In each of these settings, the liquid will flow through the dispensing spout 18 in a different manner. The dispensing spout 18 comprises an actuator 90 that enables to rotate the liquid distributor 40 about the central axis 52. According to the first embodiment of the dispensing spout 18, this actuator 90 is realized as a manual actuator. It comprises a handle element 92 by means of which the liquid distributor 40 may be manually rotated. The handle element 92 is according to the first embodiment integrally formed with the liquid distributor 40. The handle element 92 comprises a shaft 94 (see FIG. 5) to which the disc 64 of the liquid distributor 40 is directly connected. This shaft 94 builds the lower part of the handle element 92. The shaft 94 is realized as a hollow shaft and comprises an outlet channel 96 (see FIG. 5) which is part of the first liquid outlet 42 and ends in the first outlet opening 50. It is to be noted that according to the shown embodiment the separator element 58 and the actuator 90 are integral parts of the liquid distributor 40.

Figure 7A:
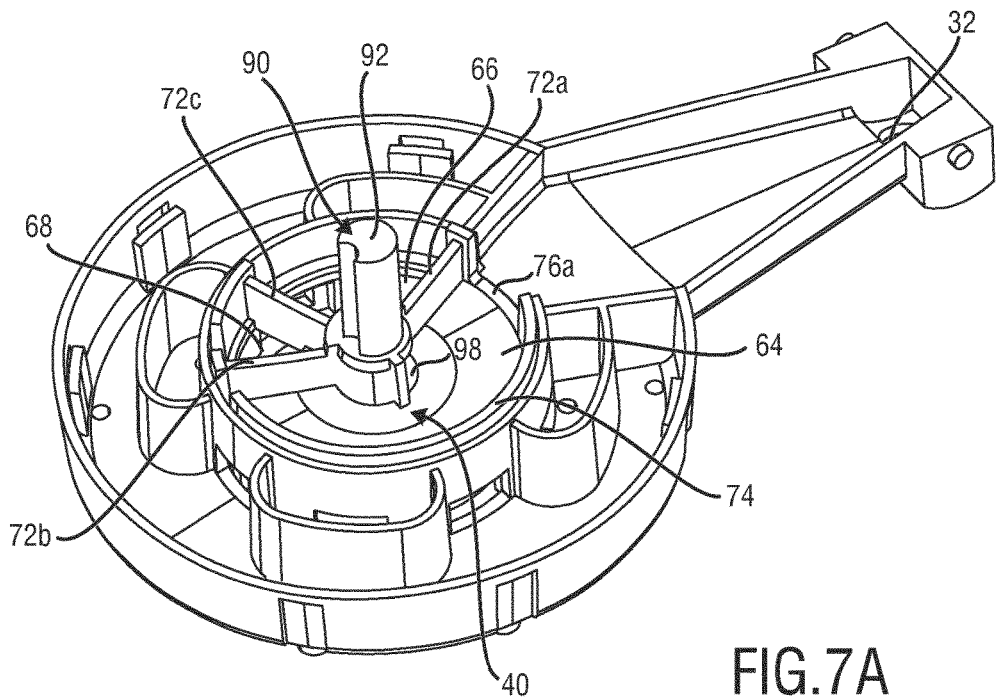
FIG. 7 shows the bottom part and a liquid distributor in a first setting of the dispensing spout according to the first embodiment in a perspective view (FIG. 7A) and a top view (FIG. 7B)
Figure 7B:
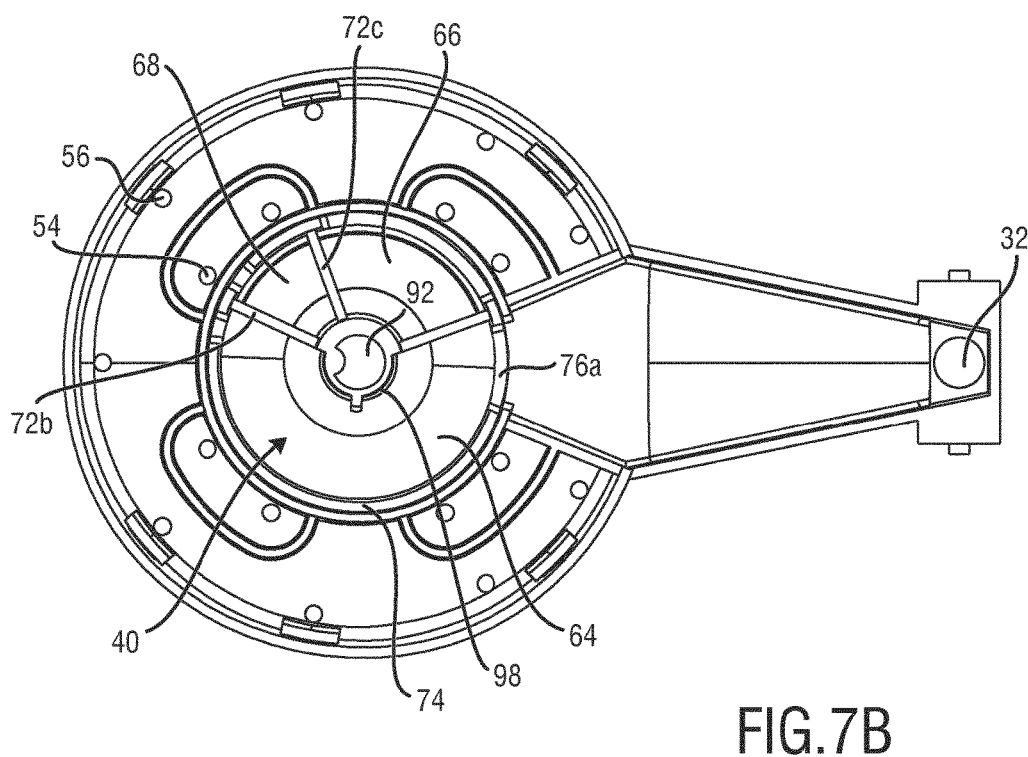

FIG. 7 shows a first setting of the dispensing spout 18 in a perspective view (FIG. 7A) and in a top view (FIG. 7B). In this first setting, the liquid is dispensed into the brewing chamber 20 via the first liquid outlet 42. The position of the liquid distributor 40 shown in FIG. 7 is herein denoted as "first position". In this first position, the liquid inlet 32 of the dispensing spout 18 is fluidly connected to the first liquid outlet 42 by means of the liquid distributor 40 in the following way: The liquid first enters the dispensing spout 18 via the liquid inlet 32. The liquid inlet 32 then enters the upper compartment 60 of the main body 34 via opening 76a. From there, the liquid flows on top of the disc 64 towards a centrally arranged inlet 98 of the outlet channel 96. The liquid then flows through the outlet channel 96 and finally leaves the dispensing spout 18 via the first outlet opening 50. As already mentioned above, this will result in the strongest taste of the brewed beverage.

Figure 8A:
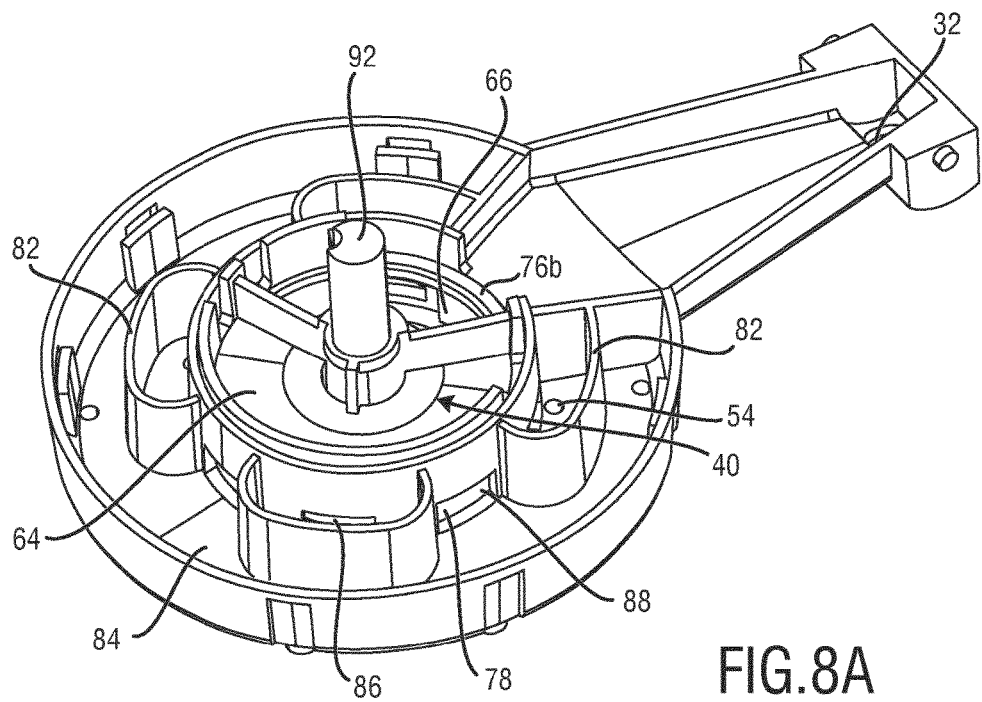
FIG. 8 shows the bottom part and the liquid distributor in a second setting of the dispensing spout according to the first embodiment in a perspective view (FIG. 8A) and a top view (FIG. 8B)
Figure 8B:
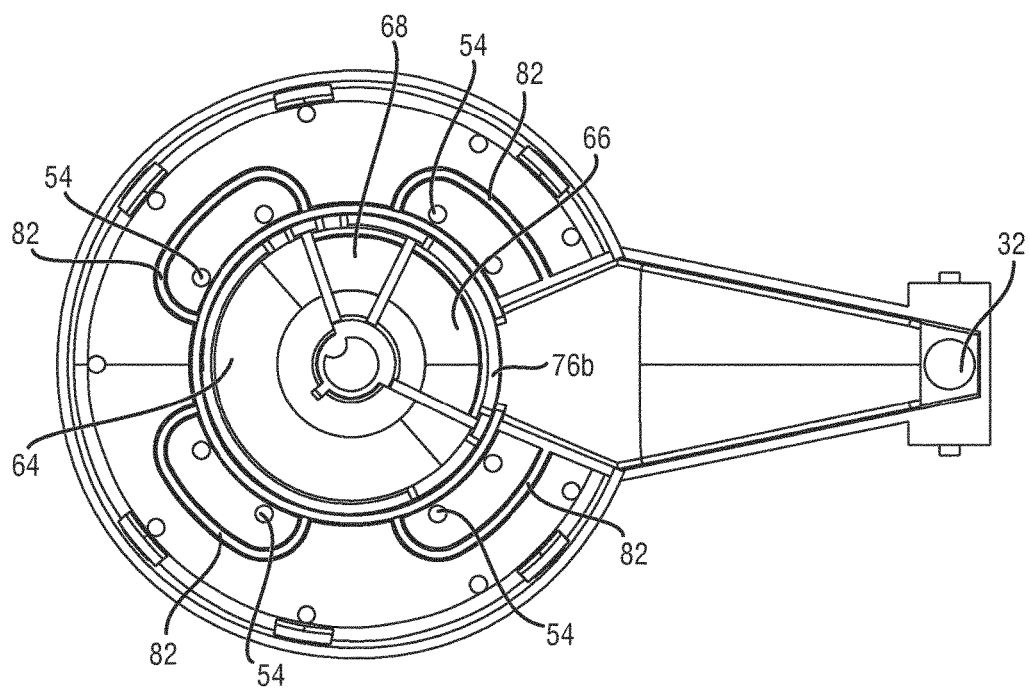

FIG. 8 shows a second setting of the dispensing spout 18 in a perspective view (FIG. 8A) and in a top view (FIG. 8B). In this second setting, the liquid distributor 40 is arranged in its second position. In this second position of the liquid distributor 40, the liquid is dispensed into the brewing chamber 20 via the second liquid outlet 44, i.e. via the plurality of second outlet openings 54. The liquid inlet 32 of the dispensing spout 18 is thereto fluidly connected to the second liquid outlet 44 in the following way: The liquid enters the dispensing spout 18 via the liquid inlet 32.

Afterwards, the liquid enters the upper compartment 60 of the main body 34 via opening 76b. From there, the liquid will flow directly downwards into the lower compartment 62 of the main body 34 by flowing through the first flow-through opening 66. As it can be seen in FIG. 8A, the blocking walls 78 of the liquid distributor 40 block openings 88 in the second position of the liquid distributor 40. In contrast thereto, openings 86 are not blocked in this position of the liquid distributor 40. The central chamber 80 is thus fluidly connected to the middle chambers 82, while the flow path from the central chamber 80 into the outer chamber 84 is blocked by means of the blocking walls 78. Fluid entering the lower compartment 62 of the main body 34 will thus flow into the middle chambers 82 via openings 86 and will then leave the dispensing spout 18 via the second outlet openings 54. As explained above, this will result in a mid-level strength of the brewed beverage.

Figure 9A:
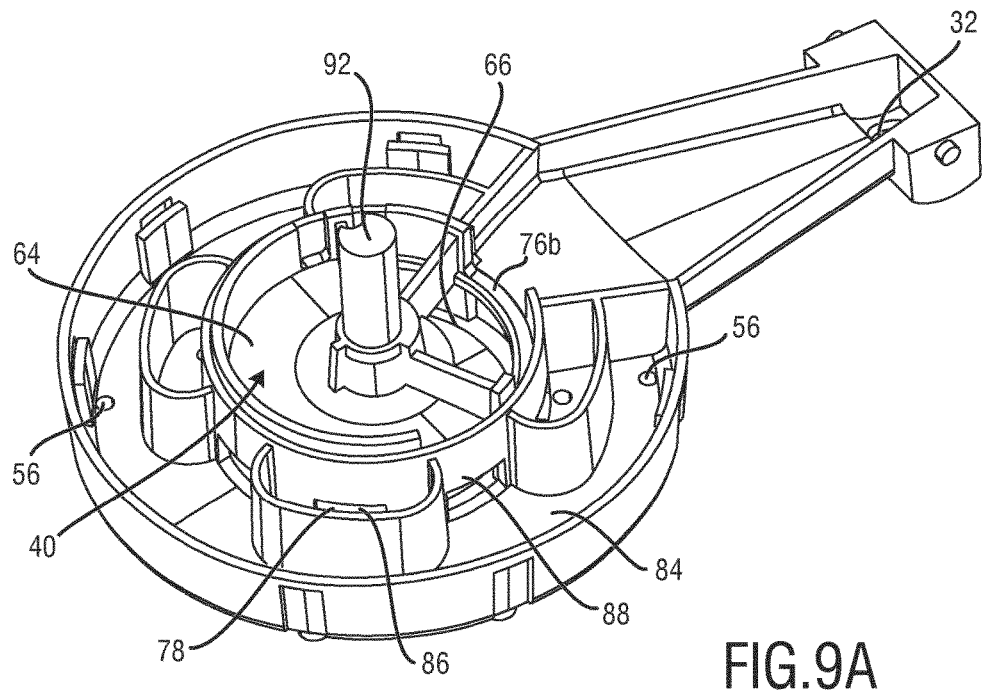
FIG. 9 shows the bottom part and the liquid distributor in a third setting of the dispensing spout according to the first embodiment in a perspective view (FIG. 9A) and a top view (FIG. 9B)
Figure 9B:
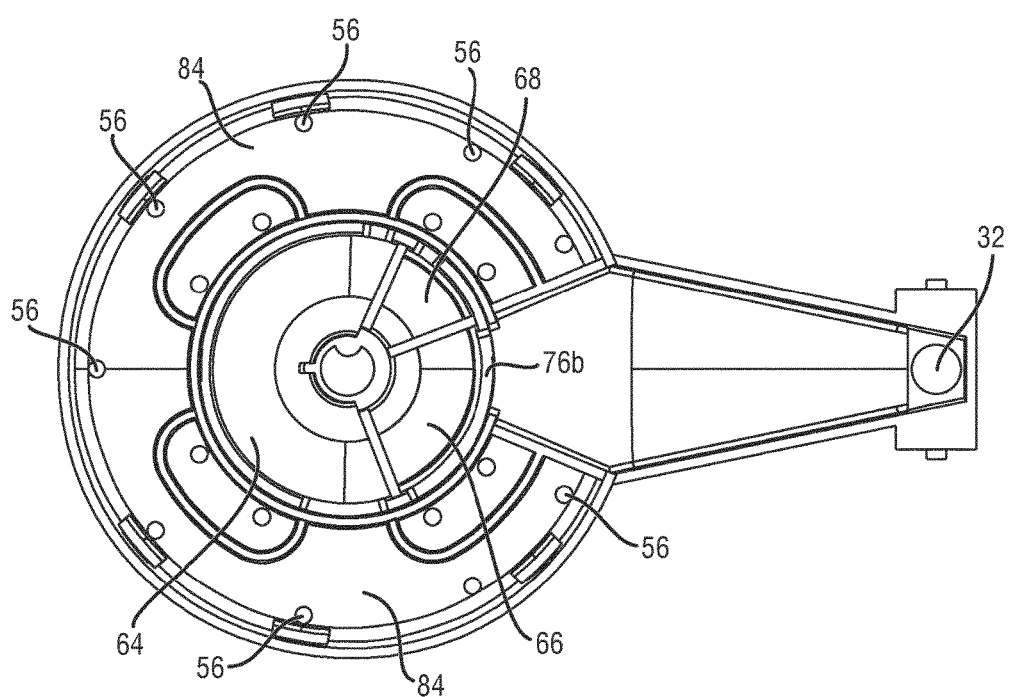

FIG. 9 shows a third setting of the dispensing spout 18 in a perspective view (FIG. 9A) and in a top view (FIG. 9B). In this third setting of the dispensing spout 18, the liquid distributor 40 is arranged in its fourth position. In this fourth position of the liquid distributor 40, the liquid inlet 32 is fluidly connected to the third liquid outlet 46 by means of the liquid distributor 40 in the following way: Liquid enters the dispensing spout 18 via the liquid inlet 32. Afterwards, the liquid will enter the upper compartment 60 of the main body 34 via opening 76b (via the same opening 76b as in the second position of the liquid distributor 40 shown in FIG. 8). However, by comparing FIGS. 8 and 9, it may be seen that the liquid distributor 40 is in FIG. 9 turned a bit further than in FIG. 8. The liquid entering the opening 76b will in the fourth position of the liquid distributor 40 again directly flow downwards via flow-through opening 66 into the lower compartment 62 of the main body 34. However, in this case blocking walls 78 do not block openings 88, but block openings 86. In the fourth position of the liquid distributor 40, the central chamber 80 is therefore fluidly connected to the outer chamber 84, while the flow path to the middle chambers 82 is blocked. The liquid thus flows from the lower compartment 62 of the central chamber 80 into the outer chamber 84, such that the liquid finally leaves the dispensing spout 18 via the third outlet openings 56. As explained above, this will result in the lowest strength of the brewed beverage.

Figure 10A:
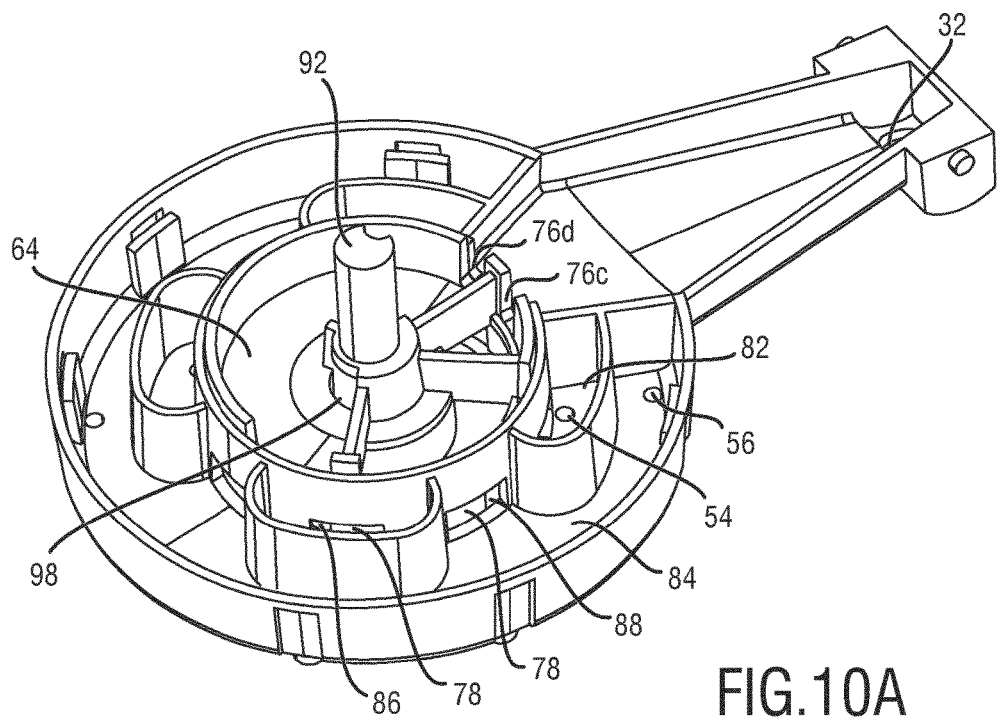
FIG. 10 shows the bottom part and the liquid distributor in a fourth setting of the dispensing spout according to the first embodiment in a perspective view (FIG. 10A) and a top view (FIG. 10B)
Figure 10B:
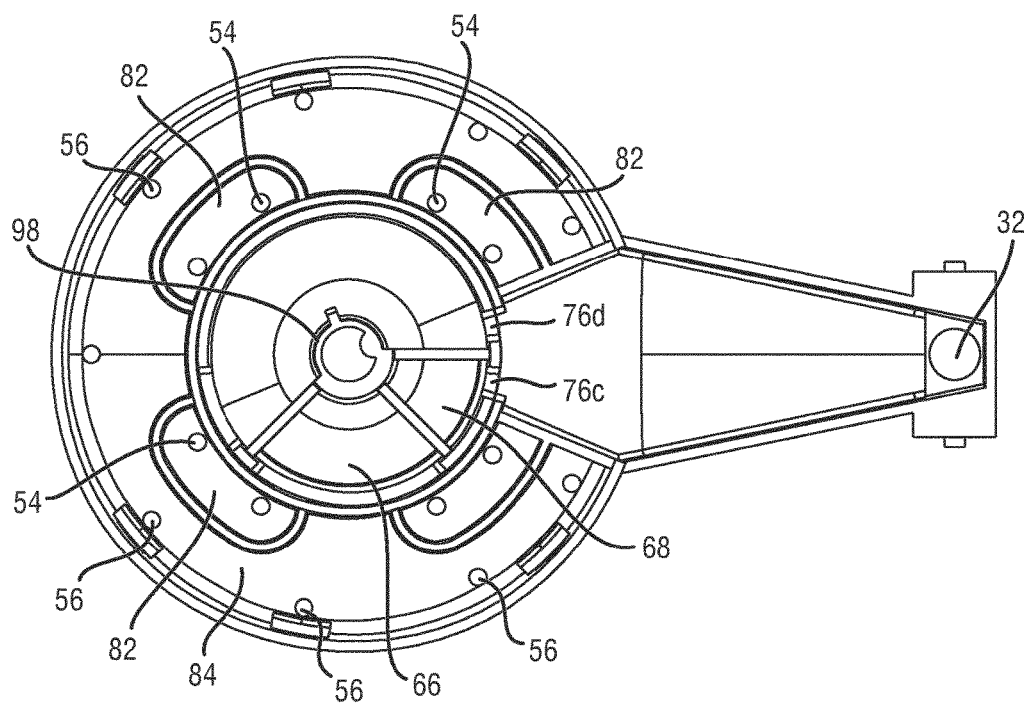
Figure 11:
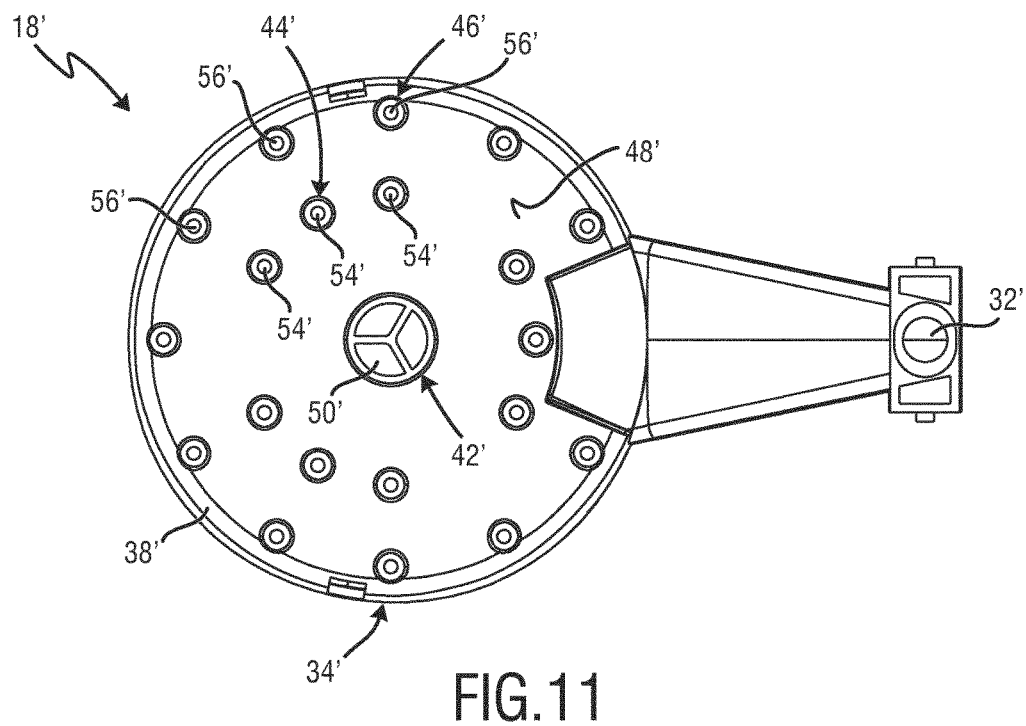
FIG. 11 shows a second embodiment of the dispensing spout of the beverage machine according to the present invention from below.
Figure 12:
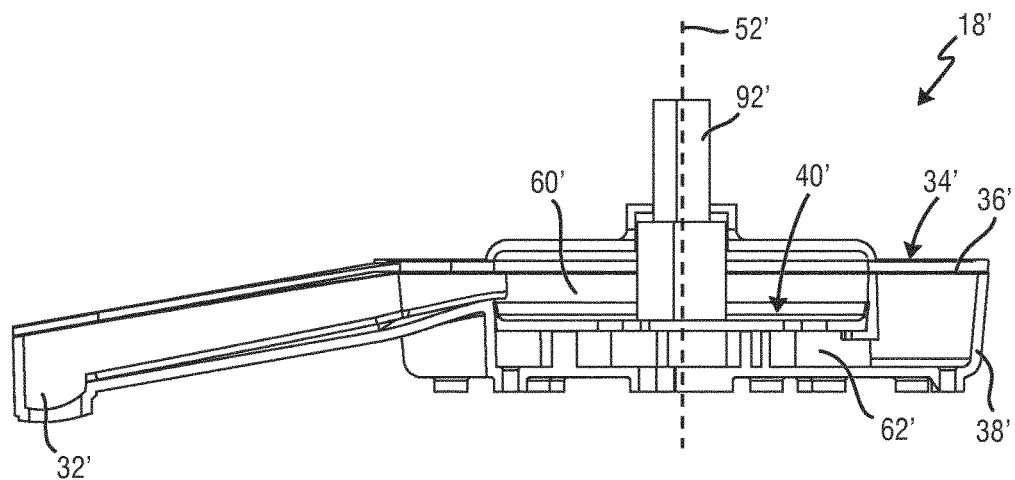
FIG. 12 shows a sectional view of the second embodiment of the dispensing spout.
Figure 13:
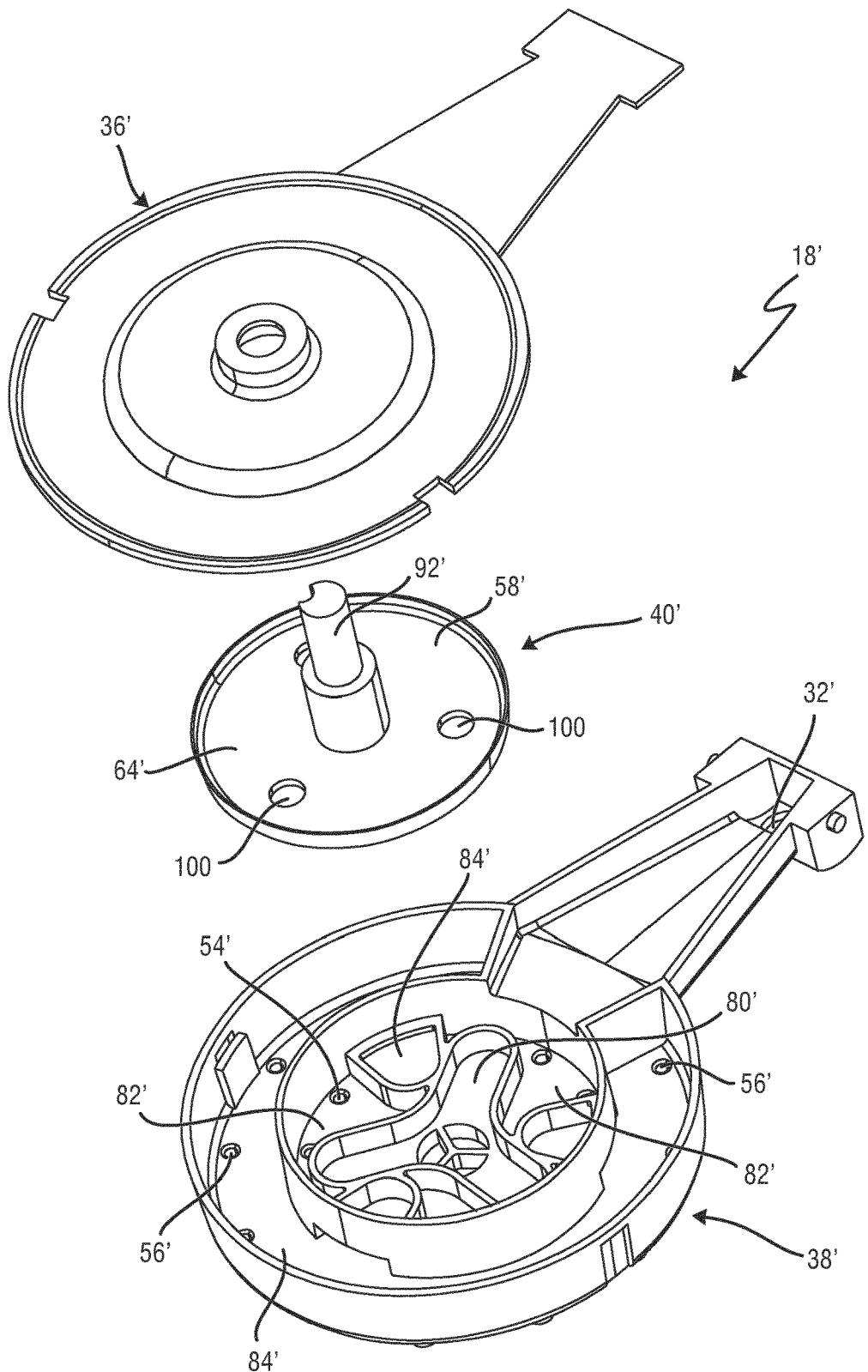
FIG. 13 shows an exploded view of the second embodiment of the dispensing spout.
Figure 14:
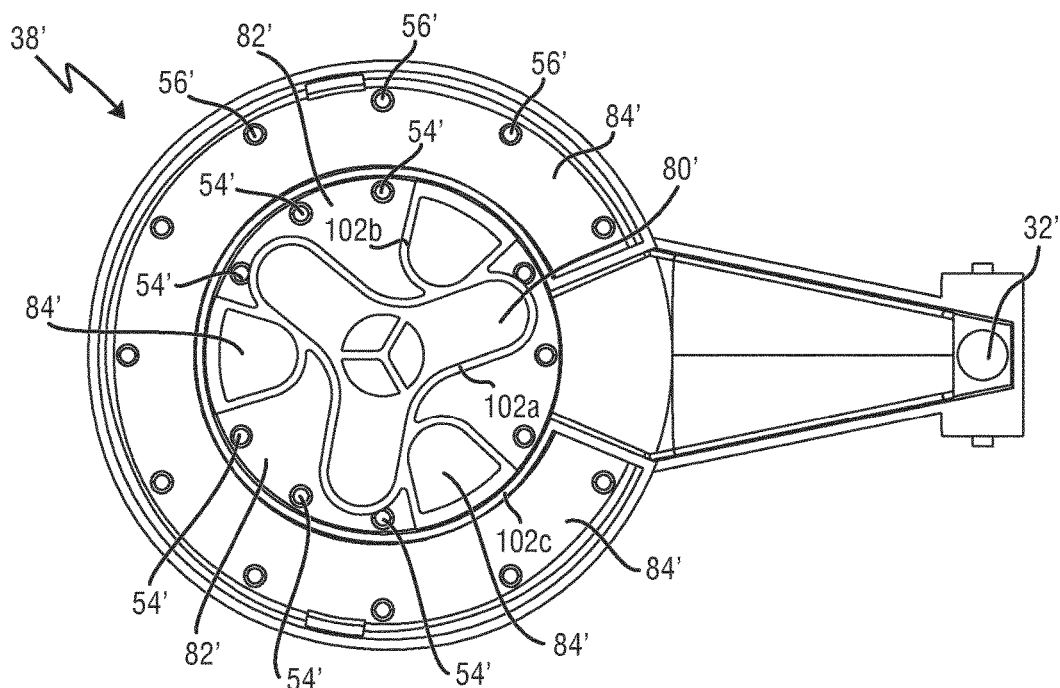
FIG. 14 shows a top view of the bottom part of the dispensing spout according to the second embodiment.

FIG. 10 shows a fourth setting of the liquid dispensing spout 18 in a perspective view (FIG. 10A) and in a top view (FIG. 10B). In this fourth setting, the liquid distributor 40 is arranged in its third position. This third position of the liquid distributor 40 is especially advantageous for cleaning or decalcifying the dispensing spout 18, as the liquid is in this case dispensed through all three liquid outlets 42, 44, 46, i.e. through all outlet openings 50, 54, 56. In other words, the liquid inlet 32 is in this case fluidly connected to the first liquid outlet 42, the second liquid outlet 44 as well as to the third liquid outlet 46 by means of the liquid distributor 40 in the following way: Liquid enters the dispensing spout 18 via the liquid inlet 32 and will then flow towards the upper compartment 60 of the main body 34. The liquid enters the upper compartment 60 via opening 76c and opening 76d. Liquid entering opening 76c will directly flow downwards through the second flow-through opening 68 into the lower compartment 62 of the main body 34 and will then flow into the middle chambers 82 and into the outer chamber 84. As it can be seen in FIG. 10A, both openings 86, 88 are thereto at least partly open. Liquid entering opening 76c will thus finally leave the dispensing spout 18 via the second outlet openings 54 and via the third outlet openings 56. The remaining liquid will enter the upper compartment 60 of the main body 34 via opening 76d and will then flow towards the first outlet opening 50 in a similar way as explained with reference to FIG. 7, i.e. over the disc 64 to the inlet 98 of the outlet channel 96, such that it may finally leave the dispensing spout 18 via the first outlet opening 50.

FIGS. 11 to 15 show a second embodiment of the dispensing spout 18. The dispensing spout according to the second embodiment is denoted by reference numeral 18'. The technical principle of the dispensing spout 18' according to the second embodiment is similar to the dispensing spout 18 according to the first embodiment. Therefore, only the differences between the two embodiments will be explained in detail. The dispensing spout 18' according to the second embodiment mainly differs from the dispensing spout 18 according to the first embodiment in the technical design of the liquid distributor 40' and in the technical design of the bottom part 38' of the main body 34' of the dispensing spout 18'.

The liquid distributor 40' again comprises a handle element 92 that is directly connected to a separator element 58'. This separator element 58' comprises a disc 64'. The disc 64' has substantially a shape of an annulus. In contrast to the disc 64 according to the first embodiment, the disc 64' according to the second embodiment does not comprise a plurality of annulus sector cut-outs, but instead comprises three flow-through openings 100 which in the shown example have a circular shape (see e.g. FIG. 13). The disc 64' again divides the interior of the main body 34' of the dispensing spout 18' into an upper compartment and a lower compartment.

The bottom part 38' of the dispensing spout 18' also comprises a central chamber 80', a plurality of middle chambers 82' and a plurality of outer chambers 84'. As it can be seen e.g. in FIG. 14, the shape of these chambers 80', 82', 84' differs from the chambers 80, 82, 84 shown in the first embodiment of the dispensing spout 18. The chambers 80', 82', 84' are separated from each other by several separating walls 102a, 102b, 102c. None of the chambers 80', 82', 84' is fluidly connected to one of the other chambers. The central chamber 80' is separated from the plurality of middle chambers 82' by means of separating wall 102a. The plurality of middle chambers 82' are separated from the outer chamber 84' by means of separating walls 102b and separating wall 102c.

By rotating the liquid distributor 40' about the central axis 52, it is still possible to distribute the liquid entering the dispensing spout 18' selectively either to the first liquid outlet 42', the second liquid outlet 44' or to the third liquid outlet 46'. In the second embodiment of the dispensing spout 18', the second liquid outlet 44' still comprises a plurality of second outlet openings 54' and the third liquid outlet 46' comprises a plurality of third outlet openings 56' (see e.g. FIG. 11).

Figure 15A:
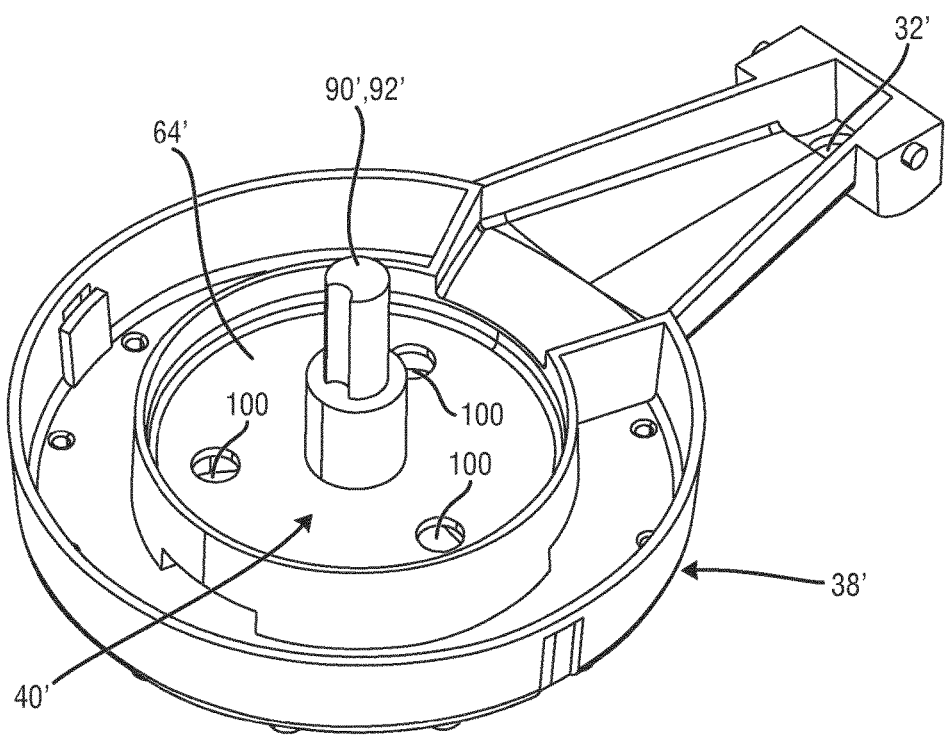
FIG. 15 shows the bottom part and the liquid distributor of the dispensing spout according to the second embodiment in a first setting (FIG. 15A), in a second setting (FIG. 15B), and in a third setting (FIG. 15C).
Figure 15B:
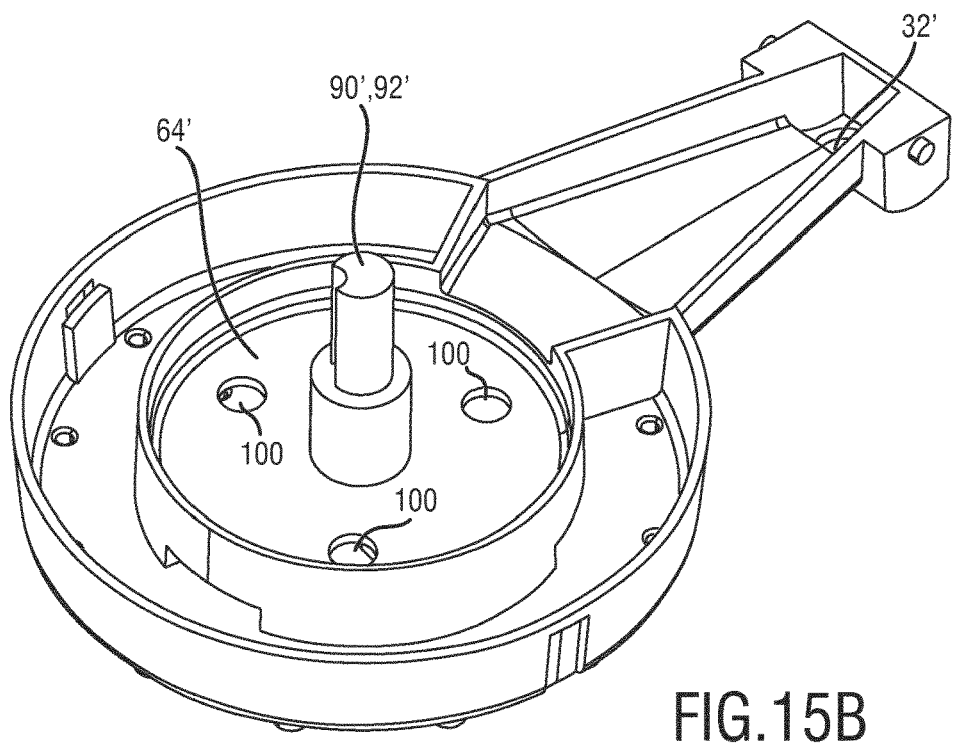
Figure 15C:
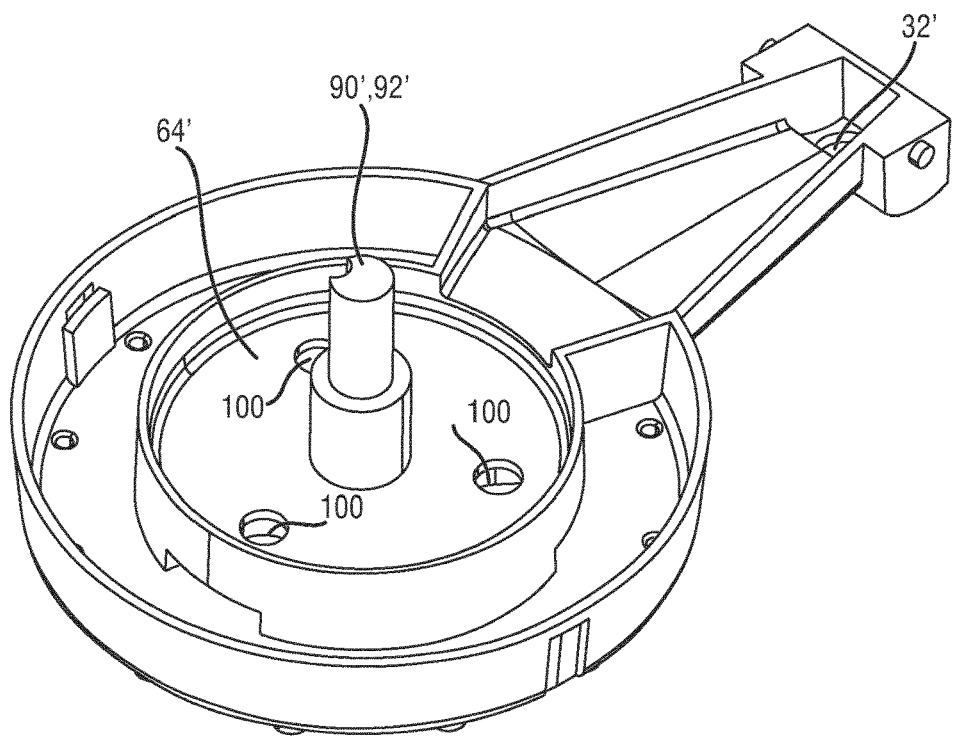

FIGS. 15A to 15C show three different settings of the dispensing spout 18'. In the first setting shown in FIG. 15A, the liquid is dispensed into the brewing chamber 20 via the first outlet opening 50' of the first liquid outlet 42'. In this case, liquid enters the dispensing spout 18' via the liquid inlet 32, flows towards the disc 64', enters the central chamber 80' via the flow-through openings 100, and finally leaves the dispensing spout 18' via the first outlet opening 50.

FIG. 15B shows the second setting of the dispensing spout 18'. In this second setting, the liquid inlet 32' is fluidly connected to the second liquid outlet 44', such that the liquid is injected into the brewing chamber 20 via the second outlet openings 54'. In this case, liquid enters the dispensing spout 18' via the liquid inlet 32', flows towards the disc 64', enters the plurality of middle chambers 82' via the flow-through openings 100, and finally leaves the dispensing spout 18' via the second outlet openings 54'.

FIG. 15C shows the third setting of the dispensing spout 18'. In this third setting, the liquid is dispensed into the brewing chamber 20 via the third liquid outlet 46'. Liquid entering the liquid inlet 32' of the dispensing spout 18' will in this case flow towards the disc 64', enter the outer chamber 84' via the flow-through openings 100, and finally leaves the dispensing spout 18' via the third outlet openings 56'. A third position of the liquid distributor 40' (as according to the first embodiment of the dispensing spout 18) does not exist according to the second embodiment of the dispensing spout 18'.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A beverage machine, comprising:
a brewing chamber; and
a dispensing spout configured to dispense liquid into the brewing chamber;
wherein the dispensing spout comprises:
a liquid inlet;
a main body having a central axis and at least first liquid outlet having a first outlet opening, a second liquid outlet having a plurality of second outlet openings, and a third liquid outlet having a plurality of third outlet openings, wherein the second outlet openings have a larger distance from the central axis than the first outlet opening, and wherein the third outlet openings have a larger distance from the central axis than the second outlet openings;
a liquid distributor fluidically connecting the liquid inlet selectively to the first outlet, to the second outlet or to the third liquid outlet, and
an actuator configured to change a position of the liquid distributor relative to the main body between at least a first, a second and a third position, wherein in the first position the liquid inlet is fluidically to the first outlet opening, wherein in the second position the liquid inlet is fluidically connected to the plurality of second outlet openings, and wherein in the third position the liquid inlet is fluidically connected to the first outlet opening and the plurality of second outlet openings,
wherein the liquid distributor comprises a separator element that divides an interior of the main body into at least an upper and a lower compartment, and wherein the separator element comprises at least one flow-through opening connecting the upper compartment to the lower compartment,
wherein the main body includes a central chamber, one or more middle chambers, and one or more outer chamber within the interior of the main body, wherein the second outlet openings are arranged in the one or more middle chambers, and the third outlet openings are arranged in the one or more outer chambers, the middle chambers and the outer cambers connect to the central chamber via respective openings, and the lower compartment of the liquid distributor includes a circumferential wall which includes a plurality of openings and a plurality of blocking walls configured such that in dependence on the rotational position of the liquid distributor, the blocking walls block the openings to the middle chambers or block the openings to the outer chambers.

2. The beverage machine as claimed in claim 1, wherein the main body of the dispensing spout comprises a lid and a bottom part which together define a hollow in the interior of the main body, wherein the upper compartment is arranged between the lid and the separator element, and wherein the lower compartment is arranged between the separator element and the bottom part.

3. The beverage machine as claimed in claim 1, wherein the separator element comprises a disc through which the at least one flow-through opening penetrates.

4. The beverage machine as claimed in claim 3, wherein the disc has substantially a shape of an annulus, and wherein the at least one flow-through opening has a shape of an annulus sector cut-out.

5. The beverage machine as claimed in claim 3, wherein the disc has substantially a shape of an annulus, and wherein the disc comprises a plurality of flow-through openings.

6. The beverage machine as claimed in claim 1, wherein the actuator comprises a handle element configured to rotate the liquid distributor about the central axis.

7. The beverage machine as claimed in claim 1, wherein at least parts of the actuator are integrally formed with the liquid distributor.

8. The beverage machine as claimed in claim 6, wherein the handle element comprises a shaft, and wherein the disc is connected to the shaft and is arranged transverse to the shaft.

9. The beverage machine as claimed in claim 8, wherein the first liquid outlet comprises an outlet channel that is arranged within a hollow in the shaft.

10. The beverage machine as claimed in claim 6, wherein the actuator comprises a latching mechanism that enables the position of the liquid distributor to change in a stepwise manner.

11. The beverage machine as claimed in claim 1, wherein, upon activation of the actuator, a position of the liquid distributor may also be changed into a fourth position, wherein in the fourth position the liquid inlet is fluidically connected to the plurality of third outlet openings.

12. A beverage machine, comprising:
a brewing chamber; and
a dispensing spout configured to dispense liquid into the brewing chamber;
wherein the dispensing spout comprises:
a liquid inlet;
a main body having a central axis and at least a first liquid outlet having a first outlet opening and a second liquid outlet having a plurality of second outlet openings, wherein the second outlet openings have a larger distance from the central axis than the first outlet opening;

a liquid distributor fluidically connecting the liquid inlet selectively to the first outlet opening or to the plurality of second outlet openings, and an actuator configured to change a position of the liquid distributor relative to the main body between at least a first, a second and a third position, wherein in the first position the liquid inlet is fluidically connected to the first outlet opening, wherein in the second position the liquid inlet is fluidically connected to the plurality of second outlet openings, and wherein in the third position the liquid inlet is fluidically connected to the first outlet opening and the plurality of second outlet openings, wherein the liquid distributor comprises a separator element that divides an interior of the main body into at least an upper and a lower compartment, and wherein the separator element comprises at least one flow-through opening connecting the upper compartment to the lower compartment, wherein the separator element comprises a disc through which the at least one flow-through opening penetrates, wherein the disc has substantially a shape of an annulus, and wherein the at least one flow-through opening has a shape of an annulus sector cut-out.

13. The beverage machine as claimed in claim 12, wherein the main body further comprises a third liquid outlet having a larger distance from the central axis than the second liquid outlet, and wherein the liquid distributor is configured to fluidically connect the liquid inlet selectively to the first liquid outlet, to the second liquid outlet, or to the third liquid outlet.

14. The beverage machine as claimed in claim 13, wherein the third liquid outlet comprises a plurality of third outlet openings.

15. The beverage machine as claimed in claim 14, wherein the second and the third outlet openings are concentrically arranged around the central axis.

16. The beverage machine as claimed in claim 14, wherein the main body comprises a central chamber, one or more middle chambers, and one or more outer chambers within the interior of the main body, wherein the second outlet openings are arranged in the one or more middle chambers, and the third outlet openings are arranged in the one or more outer chambers.

17. The beverage machine as claimed in claim 14, wherein, upon activation of the actuator, a position of the liquid distributor may also be changed into a fourth position, wherein in the fourth position the liquid inlet is fluidically connected to the plurality of third outlet openings.

18. A beverage machine, comprising:

a brewing chamber; and a dispensing spout configured to dispense liquid into the brewing chamber;

wherein the dispensing spout comprises:

a liquid inlet;

a main body having a central axis and at least a first liquid outlet having a first outlet opening and a second liquid outlet having a plurality of second outlet openings, wherein the second outlet openings have a larger distance from the central axis than the first outlet opening;

a liquid distributor fluidically connecting the liquid inlet selectively to the first outlet opening or to the plurality of second outlet openings, and an actuator configured to change a position of the liquid distributor relative to the main body between at least a first, a second and a third position, wherein in the first position the liquid inlet is fluidically connected to the first outlet opening, wherein in the second position the liquid inlet is fluidically connected to the plurality of second outlet openings, and wherein in the third position the liquid inlet is fluidically connected to the first outlet opening and the plurality of second outlet openings, wherein the liquid distributor comprises a separator element that divides an interior of the main body into at least an upper and a lower compartment, wherein the separator element comprises at least one flow-through opening connecting the upper compartment to the lower compartment, wherein the actuator comprises a handle element configured to rotate the liquid distributor about the central axis, wherein the handle element comprises a shaft, wherein the disc is connected to the shaft and is arranged transverse to the shaft, and wherein the first liquid outlet comprises an outlet channel that is arranged within a hollow in the shaft.

* * * * *